United States Patent
Sakamoto (10) Patent No.: US 8,830,669 B2
(45) Date of Patent: Sep. 9, 2014

(54) DISPLAY APPARATUS

(75) Inventor: Takeshi Sakamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 97 days.

(21) Appl. No.: 13/178,145

(22) Filed: Jul. 7, 2011

(65) Prior Publication Data

US 2012/0019997 A1   Jan. 26, 2012

(30) Foreign Application Priority Data

Jul. 22, 2010   (JP) ................ P2010-165024

(51) Int. Cl.
| | |
|---|---|
| G06F 1/16 | (2006.01) |
| H05K 5/00 | (2006.01) |
| H05K 7/00 | (2006.01) |
| F16M 11/22 | (2006.01) |
| F16M 11/10 | (2006.01) |
| H04N 5/64 | (2006.01) |

(52) U.S. Cl.
CPC ............. *F16M 11/10* (2013.01); *F16M 11/22* (2013.01); *H04N 5/64* (2013.01); *F16M 2200/08* (2013.01)
USPC ........... 361/679.22; 361/679.06; 361/679.07; 361/679.21; 361/679.6

(58) Field of Classification Search
USPC ............ 361/679.06–679.07, 679.21–679.22, 361/679.6
See application file for complete search history.

(56) References Cited

U.S. PATENT DOCUMENTS

| | | | |
|---|---|---|---|
| 7,237,755 B2 * | 7/2007 | Cho et al. .................... | 248/274.1 |
| 7,564,682 B2 * | 7/2009 | Liou et al. ................. | 361/679.22 |
| 2007/0047188 A1 * | 3/2007 | Kim ............................. | 361/681 |
| 2008/0258030 A1 * | 10/2008 | Hsuan et al. ............. | 248/346.03 |
| 2009/0256047 A1 * | 10/2009 | Zhao et al. .................... | 248/408 |

FOREIGN PATENT DOCUMENTS

| | | |
|---|---|---|
| JP | 8-46896 | 2/1996 |
| JP | 9-233407 | 9/1997 |
| JP | 2006-91713 | 4/2006 |

* cited by examiner

*Primary Examiner* — Anthony Haughton
*Assistant Examiner* — Zhengfu Feng
(74) *Attorney, Agent, or Firm* — Finnegan, Henderson, Farabow, Garrett & Dunner, L.L.P.

(57) ABSTRACT

There is provided a display apparatus including a head portion attached to a display panel which displays an image and having a hole arranged at a lower portion, a support pillar portion extending in a vertical direction and fixed to the head portion by being inserted into a hole of the head portion, the support pillar portion being detachably attached to the head portion, and a base portion in a flat plate shape, the support pillar portion being vertically attached to the base portion in a detachable manner.

8 Claims, 11 Drawing Sheets

DISPLAY APPARATUS

BACKGROUND

The present disclosure relates to a display apparatus.

Recently, a display apparatus such as a television set often uses a thin display panel such as a liquid crystal display panel. In general, a support structure (base) supporting a display panel is made of a relatively large mold component that is made by insert-molding a bent metal plate. In particular, the increase in the size of display panels is accelerated recently, and this results in a larger support structure for supporting a display panel in order to reliably support the large display panel in a stable manner (see Japanese Patent Application Laid-Open Nos. 2006-91713, 8-46896, and 9-233407).

SUMMARY

However, when the size of the support structure for supporting the display panel is increased, there is an issue in that, when a display apparatus is packed in a box for shipment, the size of the box increases due to the capacity of the support structure. In particular, in a display apparatus having a large display panel, a support structure occupies an extremely large capacity, which needs a space ensured for the support structure, and there is an issue in that not only the size of the display panel but also the size of the box greatly increases.

Therefore, there is an issue in that a fewer number of display apparatuses are carried in a vehicle such as a truck when the display apparatuses are transported during shipment. As a result, the efficiency of transportation is reduced. Then, the reduction in the efficiency of transportation increases the product cost, which becomes a disincentive for consumers to buy the display apparatuses.

By the way, some display apparatuses are provided in such a manner that a purchaser of a display apparatus is expected to assemble a support structure for supporting a display panel. However, it is difficult to provide a structure having a sufficient strength for supporting a large display panel while still being easy to assemble.

In light of the foregoing, it is desirable to provide a novel and improved display apparatus which can be packed in a minimum capacity, and which allows a user to easily assemble a support structure for supporting a display panel.

According to an embodiment of the present invention, there is provided a display apparatus includes a head portion attached to a display panel which displays an image and having a hole arranged at a lower portion, a support pillar portion extending in a vertical direction and fixed to the head portion by being inserted into a hole of the head portion, the support pillar portion being detachably attached to the head portion, and a base portion in a flat plate shape, the support pillar portion being vertically attached to the base portion in a detachable manner.

In this configuration, a first bolt insertion hole in communication with the hole is arranged at an upper portion of the head portion, and while the support pillar portion is inserted into the hole, a first bolt inserted into the first bolt insertion hole is fastened to a screw hole on an upper surface of the support pillar portion, whereby the head portion and the support pillar portion are fixed.

In this configuration, a step is arranged on a bottom surface of the hole such that a peripheral edge portion of the bottom surface is in a protruding form with respect to a central portion thereof, and when the bolt is fastened, the peripheral edge portion of the hole comes into contact with the upper surface of the support pillar portion.

In this configuration, a stopper is provided to stop rotation of the head portion with respect to the support pillar portion.

In this configuration, a second bolt insertion hole is arranged so as to penetrate through the base portion, and when the support pillar portion is vertically arranged on the base portion, a second bolt inserted into the second bolt insertion hole is fastened to a screw hole on a lower surface of the support pillar portion, whereby the base portion and the support pillar portion are fixed.

In this configuration, a step is arranged on an attachment portion of the support pillar portion of the base portion such that a peripheral edge portion corresponding to a profile of the support pillar portion is in a protruding form with respect to a central portion thereof, and when the second bolt is fastened, the peripheral edge portion in the protruding form comes into contact with the lower surface of the support pillar portion.

In this configuration, a protruding portion is arranged on the bottom surface of the support pillar portion, and a flange portion is arranged at a tip of the protruding portion, the base plate includes a first hole and a second hole, the flange portion can be inserted into the first hole, and the second hole is in communication with the first hole and has a smaller external diameter than that of the flange portion, and the protruding portion is inserted from the first hole.

In this configuration, the support pillar portion includes a first support post and a second support post, the first support post is fixed to the base portion, and the second support post is attached to the head portion and can tilt with respect to the first support post.

In this configuration, the support pillar portion is in a columnar shape, and has a detachable cover member in a cylindrical form.

The present disclosure provides the display apparatus which can be packed in a minimum capacity, and which allows a user to easily assemble a support structure for a display panel.

DETAILED DESCRIPTION OF THE EMBODIMENT

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The following explanation will be made in the order listed below.

1. Example of overall configuration of display apparatus
2. Structure of connection portion between base portion and support pillar portion
3. Structure of connection portion between support pillar portion and head portion
4. Example of specific configuration of main body of support pillar portion
5. Arrangement during packing
6. Holding structure for holding wiring cable in head portion

[1. Example of Overall Configuration of Display Apparatus]

Figure 1:
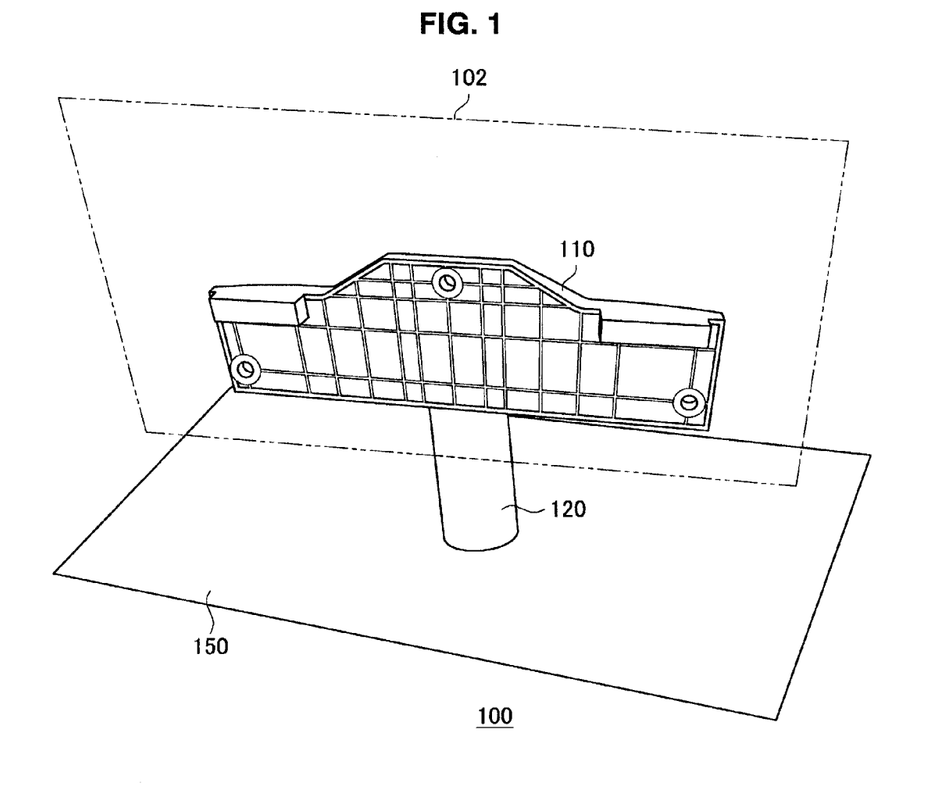
FIG. 1 is a schematic diagram illustrating an example of external appearance of a display apparatus according to an embodiment of the present disclosure.

FIG. 1 is a schematic diagram illustrating an example of external appearance of a display apparatus 100 according to an embodiment of the present disclosure. As shown in FIG. 1, the display apparatus 100 includes a display panel 102, a head portion (Head) 110 fixed to the display panel 102, a support pillar portion (Neck) 120 supporting the head portion 110, and a base portion (Base) 150 on which the support pillar portion 120 is vertically provided.

For example, the base portion 150 includes a steel plate 152 having a thickness of about 3 mm and an aluminum plate 154 having a thickness of about 0.5 mm arranged on the steel plate 152. A surface of the aluminum plate 154 is treated with alumite. The size of the base portion 150 can be appropriately set according to the size of the display panel 102. The display panel 102 can be stably held by increasing the size of the base portion 150 as the size of the display panel 102 increases.

The support pillar portion 120 includes a first support post 162 and a second support post 164. The first support post 162 is fixed to the base portion 150. The display panel 102 is fixed to the second support post 164, and the second support post 164 is configured to be able to tilt with respect to the first support post 162. The mechanism of this tilt operation will be explained later.

The head portion 110 is a mold component integrally formed of a resin material. The display panel 102 is fixed to the front side thereof. For example, the head portion 110 is made of a resin material made by mixing glass material into nylon resin. Accordingly, as compared with the use of polycarbonate resin or ABS resin, the head portion 110 is less affected by chemical attack under an environment where a lot of oil content is used in particular. Therefore, when the head portion 110 according to the present embodiment is used, damage of the head portion 110 caused by chemical attack can be reliably reduced, and the reliability can be further enhanced by increasing the strength of the head portion 110.

In FIG. 1, the display panel 102 is attached to a surface at the front side of the head portion 110.

Figure 2:
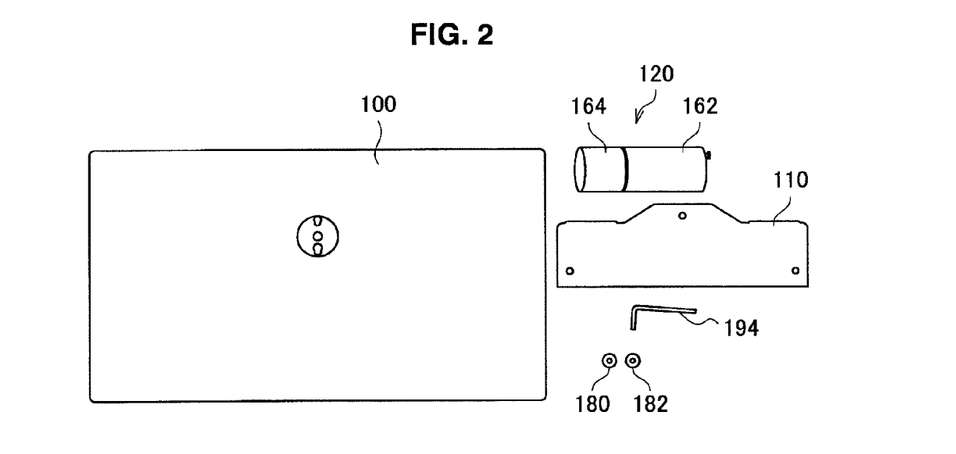
FIG. 2 is a schematic diagram illustrating constituent elements of the display apparatus except a display panel.

FIG. 2 is a schematic diagram illustrating constituent elements of the display apparatus 100 except the display panel 102. More specifically, FIG. 2 shows the head portion 110, the support pillar portion 120, the base portion 150, and further shows bolts 180, 182, and a hexagonal wrench 184 that are used when they are assembled. As shown in FIG. 2, the main components constituting the display apparatus 100 are disassembled when the display apparatus 100 is shipped. A user who purchases the product assembles the display apparatus 100 by connecting the head portion 110, the support pillar portion 120, and the base portion 150 with each other. In this case, according to the display apparatus 100 of the present embodiment, the user can assemble the display apparatus 100 only by fastening the two bolts 180, 182 using the hexagonal wrench 184. However, the display panel 102 is already fixed to the head portion 110 in advance before the display apparatus 100 is shipped and basically, the display panel 102 and the head portion 110 are configured not to be disassembled by a user.

Figure 3:
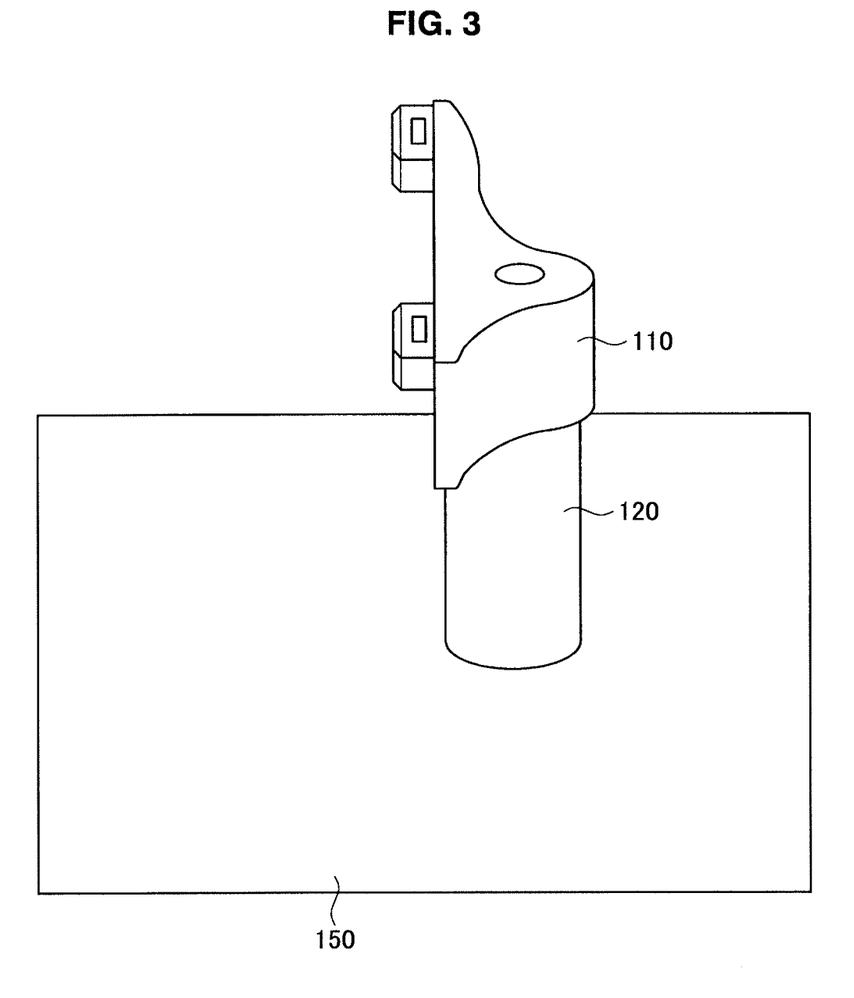
FIG. 3 is a schematic diagram illustrating a head portion, a support pillar portion, and a base portion when they are assembled.

FIG. 3 is a schematic diagram illustrating the head portion 110, the support pillar portion 120, and the base portion 150 when they are assembled. In FIG. 3, the display panel 102 is not shown. The base portion 150 and the support pillar portion 120 are fixed by the bolt 180. The support pillar portion 120 and the head portion 110 are fixed by the bolt 182. Hereinafter, the above fixing structure will be explained in detail.

[2. Structure of Connection Portion Between Base Portion and Support Pillar Portion]

Figure 4:
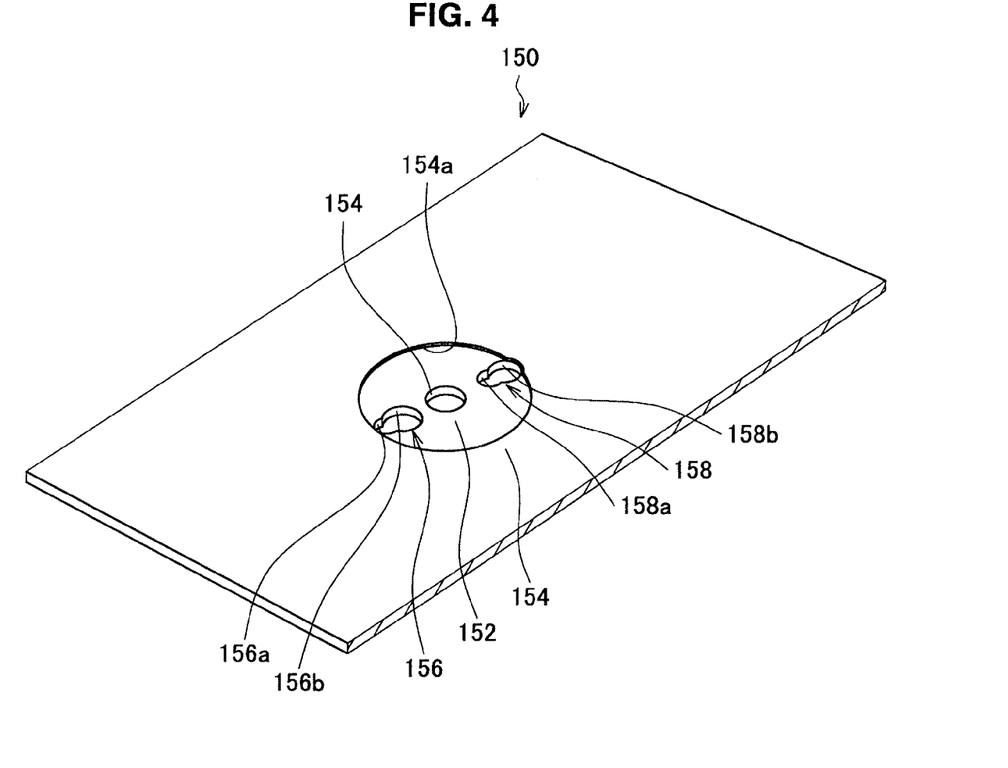
FIG. 4 is a perspective view illustrating a connection portion with a support pillar portion provided on an upper surface of a base portion.
Figure 5:
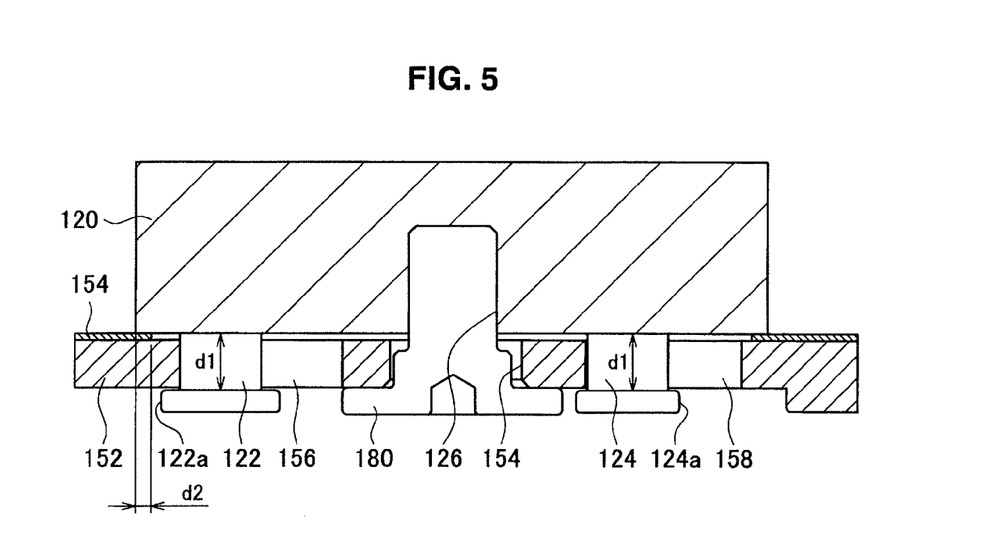
FIG. 5 is a cross-sectional view illustrating the connection portion between the base portion and the head portion.
Figure 6:
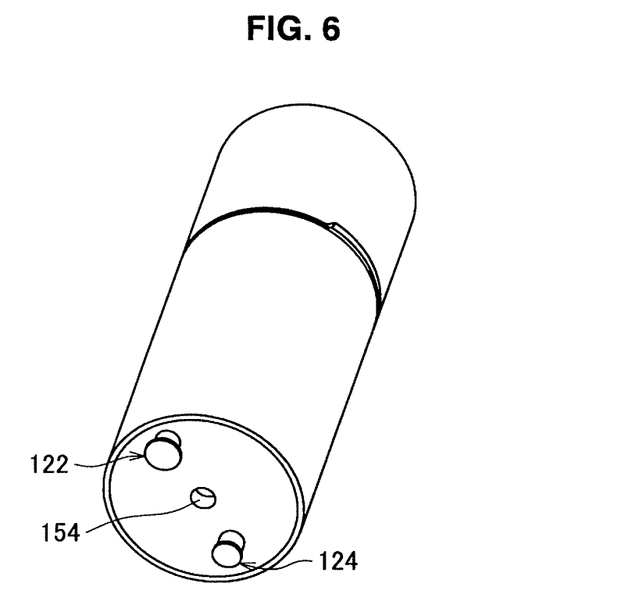
FIG. 6 is a perspective view illustrating the support pillar portion as seen from a bottom surface side.

FIGS. 4 to 6 are schematic diagrams illustrating the connection portion between the base portion 150 and the support pillar portion 120. More specifically, FIG. 4 is a perspective view illustrating the connection portion with the support pillar portion 120 provided on the upper surface of the base portion 150. FIG. 5 is a cross-sectional view illustrating the connection portion between the base portion 150 and the head portion 110. FIG. 6 is a perspective view illustrating the support pillar portion 120 as seen from a bottom surface side.

As shown in FIG. 4, the base portion 150 includes the aluminum plate 154 having a thickness of about 0.5 mm provided on the steel plate 152. On the upper surface of the base portion 150, a circular opening portion 154a is made in the aluminum plate 154, so that the steel plate 152 is exposed in the opening portion 154a. Then, in the region of the opening portion 154a, three holes 154, 156, 158 are provided in the steel plate 152. The bolt 180 is inserted into the central hole 154 for fixing the support pillar portion 120. Protruding portions 122, 124 provided on the support pillar portion 120 are inserted into the two holes 156, 158 provided on either side of the hole 154.

As shown in FIG. 6, the two protruding portions 122, 124 to be inserted into the holes 156, 158 are provided on the bottom surface of the support pillar portion 120. As shown in a cross-sectional view of FIG. 5, the protruding portions 122, 124 are inserted into the holes 156, 158 of the base portion 150. In this state, the bolt 180 is inserted into the hole 154 of the base portion 150, and the bolt 180 is fastened by being screwed into a screw hole 126 of the support pillar portion 120.

Figure 7:
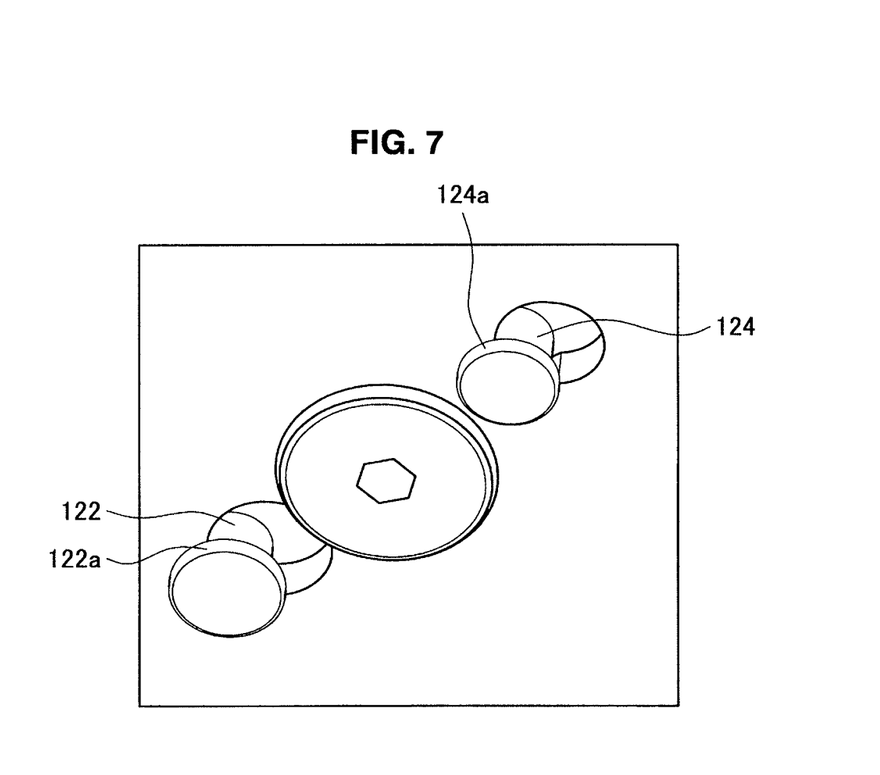
FIG. 7 is a schematic diagram illustrating a bottom surface of the base portion when bolts are fastened to fix the base portion and the support pillar portion.

FIG. 7 is a figure illustrating the bottom surface of the base portion 150. In FIG. 7, the bolt 180 is fastened to fix the base portion 150 and the support pillar portion 120. As shown in FIGS. 5 and 7, flange portions 122a, 124a are respectively provided at tips of the protruding portions 122, 124.

As shown in FIG. 4, the hole 156, into which the protruding portion 122 and the flange portion 122a are inserted, is made by connecting a circular hole 156a corresponding to the diameter of the protruding portion 122 and a circular hole 156b corresponding to the diameter of the flange portion 122a. The diameter of the hole 156a is configured to be slightly larger than the diameter of the protruding portion 122, and the diameter of the hole 156b is configured to be slightly larger than the diameter of the flange portion 122a. The diameter of the hole 156a is configured to be smaller than the diameter of the flange portion 122a.

Likewise, as shown in FIG. 4, the hole 158, into which the protruding portion 124 and the flange portion 124a are inserted, is made by connecting a circular hole 158a corresponding to the diameter of the protruding portion 124 and a circular hole 158b corresponding to the diameter of the flange portion 124a. The diameter of the hole 158a is configured to be slightly larger than the diameter of the protruding portion 124, and the diameter of the hole 158b is configured to be slightly larger than the diameter of the flange portion 124a. The diameter of the hole 158a is configured to be smaller than the diameter of the flange portion 124a.

The distance between the central axis of the protruding portion 122 and the central axis of the protruding portion 124 is the same as the distance between the center of the hole 156a and the center of the hole 158a. The distance between the central axis of the protruding portion 122 and the central axis of the protruding portion 124 is the same as the distance between the center of the hole 156b and the center of the hole 158b.

When the protruding portions 122, 124 are located within the holes 156a, 158a, the position of the hole 154 is configured to be the same as the position of the screw hole 126.

As shown in FIG. 5, a distance d1 from the bottom surface of the support pillar portion 120 to the flange portion 122a and the flange portion 124a corresponds to the thickness of the base portion 150.

Figure 8A:
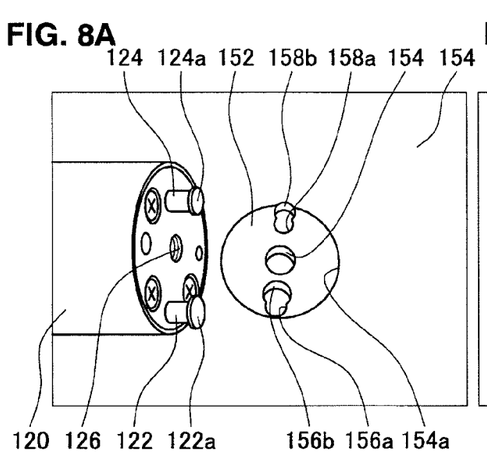
FIGS. 8A to 8F are schematic diagrams illustrating a procedure for assembling the support pillar portion, the base portion, and the head portion.

Subsequently, a procedure for attaching the support pillar portion 120 having the above configuration to the base portion 150 will be explained. FIGS. 8A to 8F are schematic diagrams illustrating a procedure for assembling the support pillar portion 120, the base portion 150, and the head portion 110. First, as shown in FIG. 8A, the flange portion 122a and the flange portion 124a are inserted into the hole 156b and the hole 158b, respectively. At this occasion, as described above, the diameter of the hole 156b is configured to be slightly larger than the diameter of the flange portion 122a, the diameter of the hole 158b is configured to be slightly larger than the diameter of the flange portion 124a. Therefore, the flange portions 122a, 124a penetrate through the holes 156b, 158b, respectively, so as to protrude from the back surface of the base portion 150. In this state, the protruding portions 122, 124 are respectively inserted into the holes 156b, 158b.

Figure 8B:
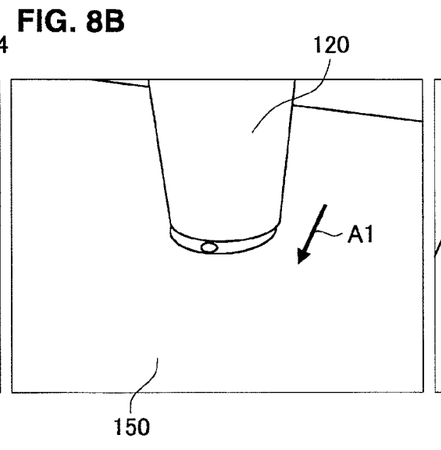

Subsequently, as shown in FIG. 8B, while the flange portions 122a, 124a are penetrating through the holes 156b, 158b, the support pillar portion 120 is slid in a direction of arrow A1 so that the protruding portions 122, 124 move from the holes 156b, 158b into the holes 156a, 158a. As a result, the protruding portion 122 moves into the hole 156a, and the protruding portion 124 moves into the hole 158a. In this state, the diameter of the hole 156a is smaller than the diameter of the flange portion 122a, and the diameter of the hole 158a is smaller than the diameter of the flange portion 124a, and therefore, the flange portions 122a, 124a are engaged with the holes 156a, 158a, respectively. Therefore, in this state, the support pillar portion 120 is not detached from the base portion 150. Also, in this state, the position of the hole 154 into which the bolt 180 is inserted is the same as the position of the screw hole 126.

Figure 8C:
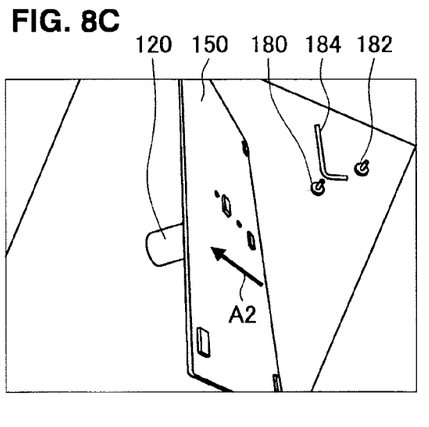

Subsequently, as shown in FIG. 8C, the base portion 150 is turned over, so that the base portion 150 is placed diagonally. In this state, one side of the base portion 150 and the tip of the support pillar portion 120 are in contact with the ground. At this occasion, the base portion 150 is turned over so that the direction of arrow A1 in FIG. 8B is in the same direction as the direction of arrow A2 in FIG. 5C. As a result, in the state of FIG. 8C, the flange portions 122a, 124a can also maintain the engaged state of the holes 156a, 158a, respectively, whereby the support pillar portion 120 is prevented from being detached from the base portion 150.

Figure 8D:
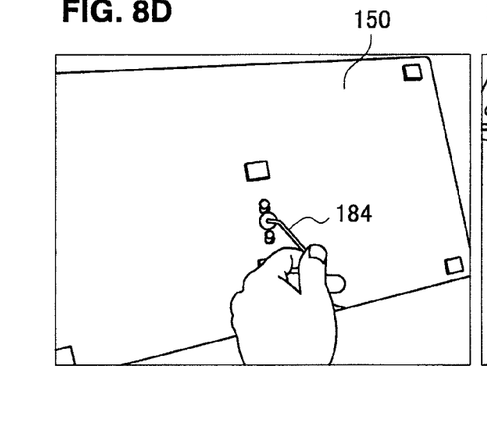

Subsequently, as shown in FIG. 8D, the bolt 180 is inserted into the hole 154 of the base portion 150, and using the hexagonal wrench 184, the bolt 180 is fastened to the screw hole 126 of the support pillar portion 120. As a result, the support pillar portion 120 is fixed to the base portion 150.

As shown in FIG. 5, the size of the opening portion 154a made in the aluminum plate 154 of the base portion 150 is configured to be smaller than the diameter of the support pillar portion 120. Accordingly, the base portion 150 is in contact with the bottom surface of the support pillar portion 120 in a ring-shaped region having a width d2 at a periphery of the opening portion 154a. In other words, the bottom surface of the support pillar portion 120 is in surface contact with the aluminum plate 154 of the base portion 150 in the ring-shaped region having the width d2 along the profile of the bottom surface of the support pillar portion 120. In this configuration, even though the support pillar portion 120 and the base portion 150 are fixed by only one bolt 180, the support pillar portion 120 and the base portion 150 can be fixed rigidly and reliably.

Further, at this occasion, the two protruding portions 122, 124 are engaged with the hole 156a and the hole 158a, respectively, which reliably prevents rotation of the support pillar portion 120 about the bolt 180. Therefore, the support pillar portion 120 does not rotate after the bolt 180 is fastened, and this reliably prevents loosening of the fastened bolt 180.

Further, even if the bolt 180 is damaged or broken, the support pillar portion 120 and the base portion 150 are not separated from each other since the flange portions 122a, 124a are engaged with the holes 156a, 158a, respectively. Therefore, the support pillar portion 120 and the base portion 150 are maintained in an engaged state.

[3. Structure of Connection Portion Between Support Pillar Portion and Head Portion]

Figure 9:
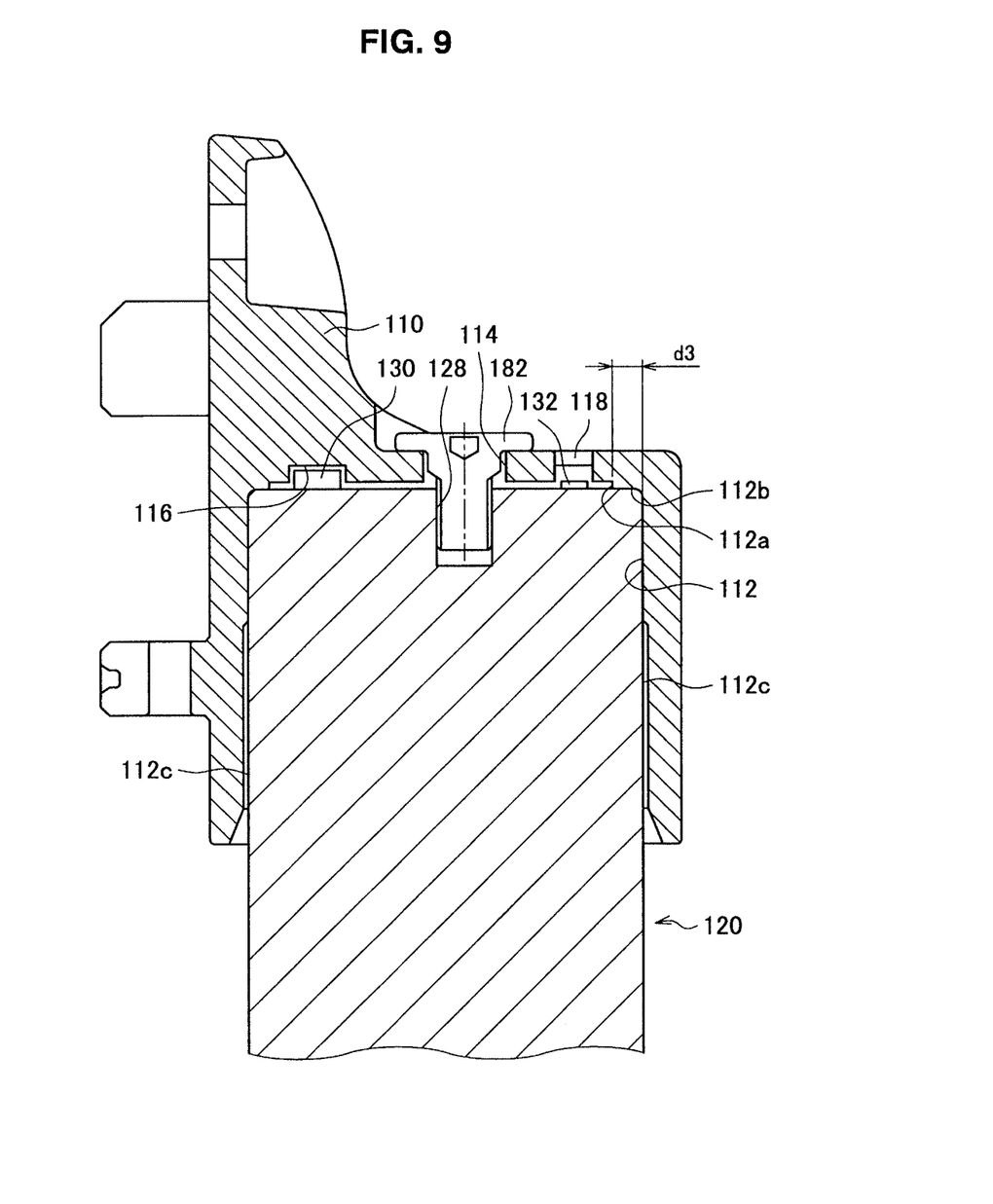
FIG. 9 is a cross-sectional view schematically illustrating the connection portion between the head portion and the support pillar portion.

Subsequently, the structure of the connection portion between the support pillar portion 120 and the head portion 110 will be explained. The configuration of FIG. 3 is completed by fixing the support pillar portion 120 to the base portion 150 and thereafter fixing the head portion 110 to the upper end of the support pillar portion 120 by inserting the head portion 110. FIG. 9 is a cross-sectional view schematically illustrating the connection portion between the head portion 110 and the support pillar portion 120.

As shown in FIG. 9, the head portion 110 has a hole 112 into which the support pillar portion 120 is inserted. The head portion 110 is coupled with the support pillar portion 120 by inserting the upper end of the support pillar portion 120 into the hole 112. At this occasion, using the bolt 182, the head portion 110 and the support pillar portion 120 are fixed.

As shown in FIG. 9, the upper end of the support pillar portion 120 has a screw hole 128 into which the bolt 182 is screwed. Further, the head portion 110 has a hole 114 at a position corresponding to the screw hole 128.

The upper surface of the support pillar portion 120 has a protruding portion 130. In addition, the head portion 110 has a hole 116 at a position corresponding to the protruding portion 130, and when the support pillar portion 120 is inserted into the hole 112 of the head portion 110, the protruding portion 130 is engaged with the hole 116. Accordingly, when the head portion 110 and the support pillar portion 120 are fixed by fastening the bolt 182, the head portion 110 is prevented from rotating with respect to the support pillar portion 120 since the protruding portion 130 is engaged with the hole 116. Therefore, since the head portion 110 does not rotate with respect to the support pillar portion 120, this reliably prevents loosening of the bolt 182 after the bolt 182 is fastened.

The head portion 110 has a hole 118 penetrating the head portion 110 from the hole 112 to the upper portion. Further, the upper surface of the support pillar portion 120 has a protruding mark 132 at the position corresponding to the hole 118. Preferably, the mark 132 is in a metallic, conspicuous color. Therefore, when a user attaches the head portion 110 to the support pillar portion 120, the user can align the positions of the protruding portion 130 and the hole 116 by aligning the positions of the hole 118 and the mark 132 while seeing them from above, thus smoothly attaching the support pillar portion 120 to the head portion 110.

As shown in FIG. 9, the bottom surface of the hole 112 of the head portion 110, with which the support pillar portion 120 is in contact, has a step portion 112a at a peripheral portion. Accordingly, when the support pillar portion 120 is inserted into the hole 112, the peripheral edge on the upper surface of the support pillar portion 120 is in surface contact with a ring-shaped surface 112b having a width d3 formed by the step portion 112a. Inside of a ring-shaped surface 112b having a width d3, a clearance is provided between the bottom of the hole 112 and the tip of the support pillar portion 120. Accordingly, when the bolt 182 is fastened, force is applied to reduce the clearance, which increases the strength of the contact between the surface 112b and the upper surface of the support pillar portion 120. Therefore, like the connection portion between the base portion 150 and the support pillar portion 120, the connection portion between the support pillar portion 120 and the head portion 110 allows the support pillar portion 120 and the head portion 110 to be fixed rigidly and reliably by surface contact.

On the side surface of the hole 112, ribs 112c extending in the longitudinal direction of the support pillar portion 120 are arranged at a plurality of portions. Further, when the support pillar portion 120 is inserted into the hole 112, the tips of the ribs 112c are deformed so that the support pillar portion 120 is pressed into the hole 112. In this configuration, the integrity of the support pillar portion 120 and the head portion 110 can be further enhanced, and the strength of the connection portion can be enhanced.

Figure 8E:
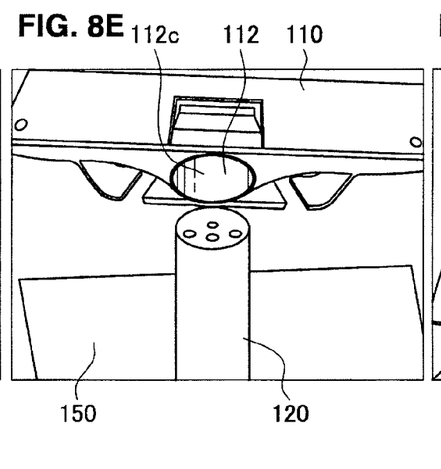
Figure 8F:
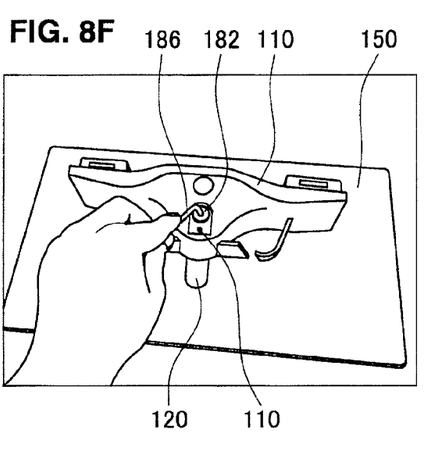

Subsequently, on the basis of FIGS. 8E and 8F, a procedure for attaching the support pillar portion 120 to the head portion 110 will be explained. When the support pillar portion 120 is fixed to the base portion 150 in the steps up to FIG. 8D, the tip of the support pillar portion 120 is subsequently inserted into the hole 112 as shown in FIG. 8E. Subsequently, as shown in FIG. 8F, a user confirms that the position of the hole 118 is at the position of the mark 132 by seeing the hole 118 of the head portion 110 from above, and completely inserts the support pillar portion 120 into the head portion 110. Thereafter, the bolt 182 is inserted into the hole 114 of the head portion 110, and using the hexagonal wrench 186, the bolt 182 is fastened into the screw hole 128. As a result, the configuration as shown in FIG. 3 is completed, and the display apparatus 100 is formed.

As described above, according to the structure of the connection portions between the base portion 110, the support pillar portion 120, and the head portion 150 of the present embodiment, each connection portion can be rigidly fixed by one bolt. Further, when the connection portions of the base portion 110, the support pillar portion 120, and the head portion 150 are disassembled, they can be disassembled only by removing one bolt of each connection portion. Therefore, the support structure of the display panel 102 can be structured that can be easily assembled by a user and that can rigidly hold the large display panel 102. Further, each connection portion is fixed only by one bolt, this can appropriately reduce the rigidity of the support structure including the head portion 110, the support pillar portion 120, and the base portion 150. Therefore, during earthquake, vibration and shake can be efficiently absorbed by the elasticity of the head portion 110, the support pillar portion 120, and the base portion 150, which can further improve the earthquake protection performance.

[4. Example of Specific Configuration of Main Body of Support Pillar Portion]

Figure 10A:
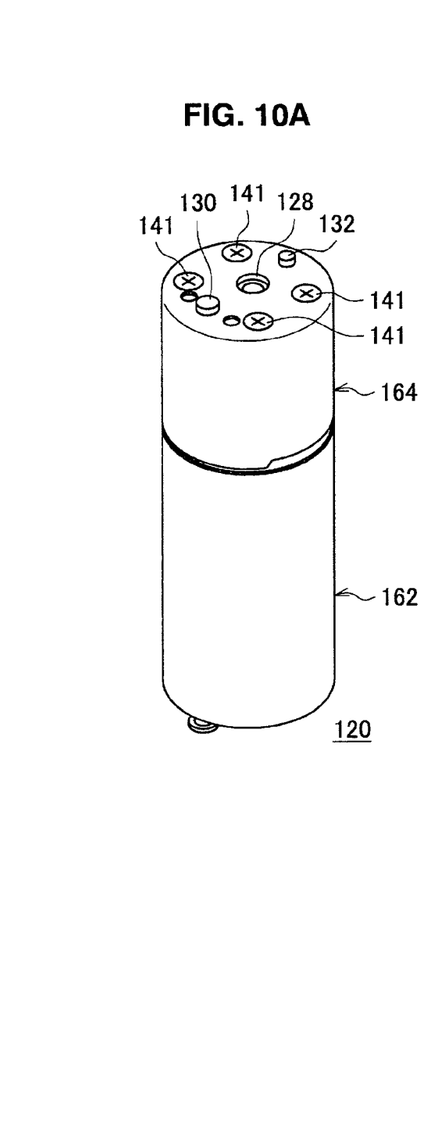
FIGS. 10A to 10C are schematic diagrams illustrating a configuration of a support pillar portion 120.

Subsequently, based on FIG. 10, the example of specific configuration of the support pillar portion 120 will be explained. FIGS. 10A to 10C are schematic diagrams illustrating a specific configuration of the support pillar portion 120. In this case, FIG. 10A is a perspective view illustrating an external appearance of the support pillar portion 120. As described above, the support pillar portion 120 includes the first support post 162 and the second support post 164. The second support post 164 can tilt with respect to the first support post 162.

Figure 10B:
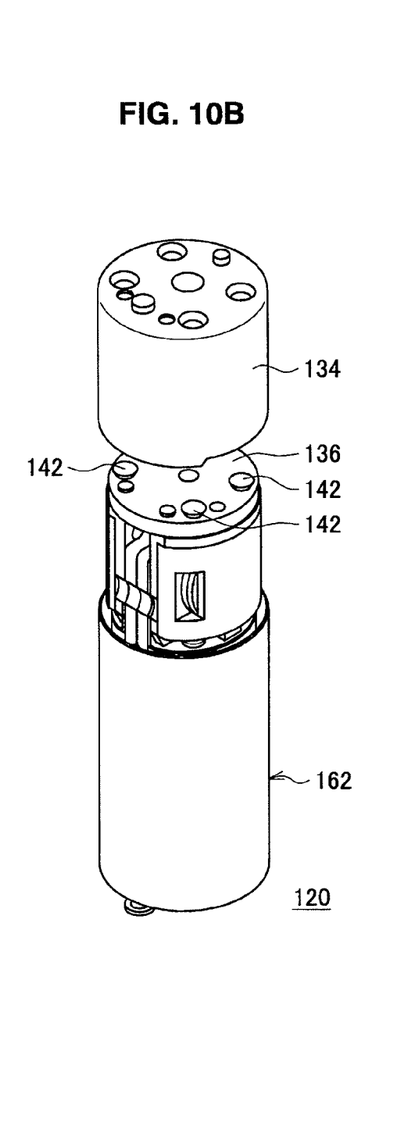
Figure 10C:
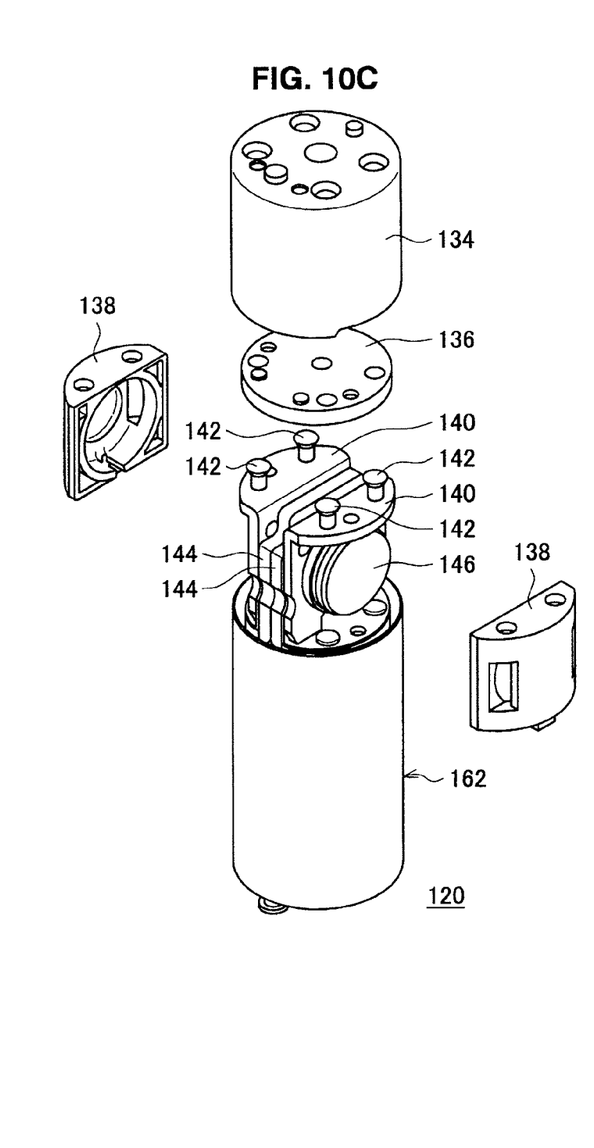

FIG. 10B illustrates the second support post 164 from which the upper cover 134 is detached. FIG. 10C illustrates the second support post 164 from which a plate 136 and a side cover 138 are detached as compared with the state of FIG. 10B.

The upper cover 134 includes, for example, a metal formed product such as die-cast, and is fixed to the plate 136 by four screws 141. Further, the plate 136 is fixed to two L-shaped rotation plates 140 by four screws 142.

Two L-shaped fixing plates 144 are fixed to the upper portion of the first support post 162. The two rotation plates 140 are provided on the outside of the two fixing plates 144, and the shaft 146 penetrates the rotation plates 140 and the fixing plates 144. The two rotation plates 140 are integrated by the plate 136, and is configured to be able to rotate with respect to the fixing plates 144 about the shaft 146.

Figure 11A:
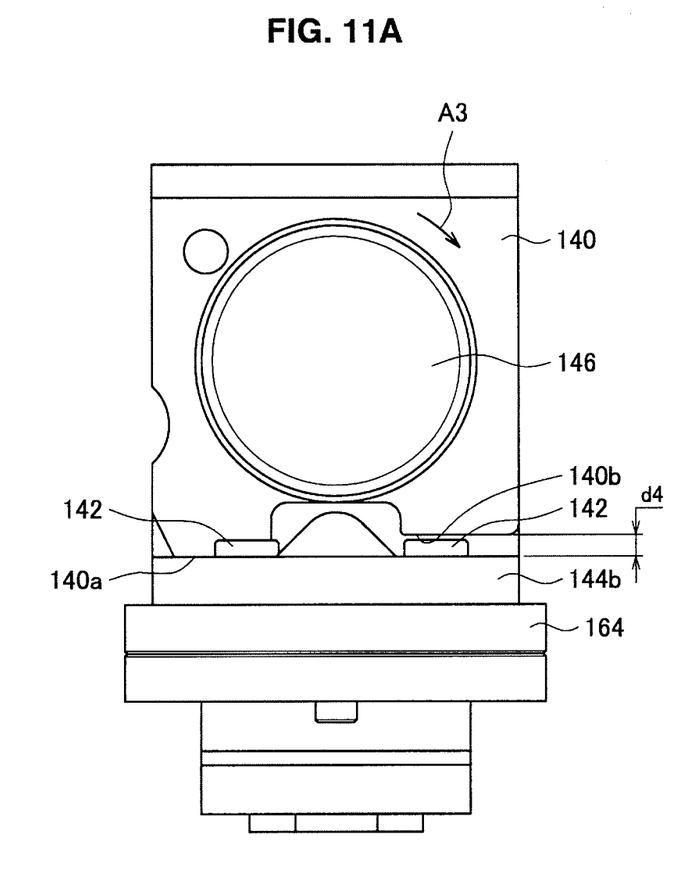
FIGS. 11A to 11B are schematic diagrams illustrating a configuration of a rotation plate and a fixing plate in detail.
Figure 11B:
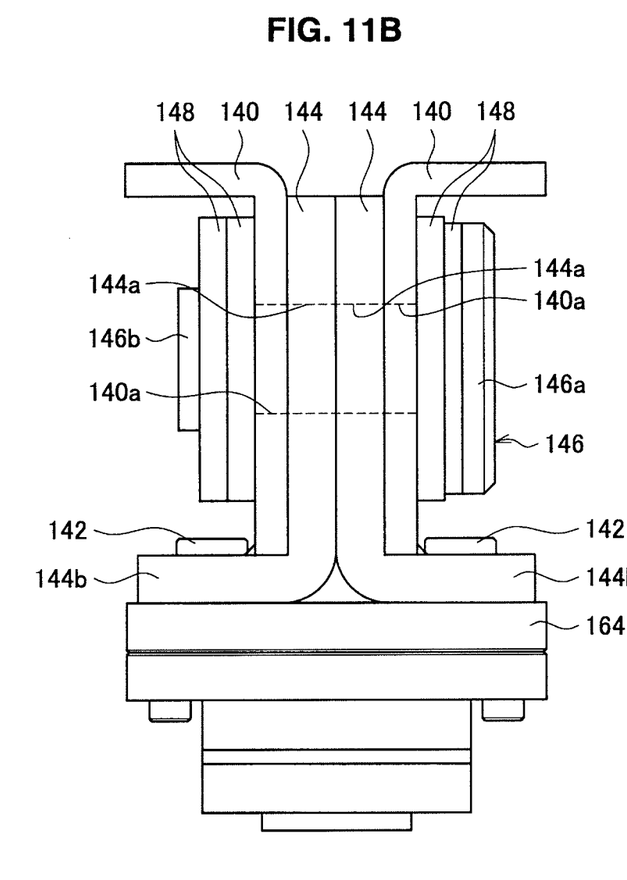

FIG. 11 is a schematic diagram illustrating a configuration of the rotation plate 140 and the fixing plate 144 in detail. In this case, FIG. 11A is a schematic diagram illustrating the rotation plates 140 when the rotation plates 140 are seen in the direction of the central axis of the shaft 146. FIG. 11B is a schematic diagram illustrating the rotation plates 140 and the fixing plates 144 when the rotation plates 140 and the fixing plates 144 are seen in a direction perpendicular to the central axis of the shaft 146.

As shown in FIG. 11B, the shaft 146 is inserted into holes 136a, 144a made in the rotation plates 140 and the fixing plates 144 so as to penetrate the holes 136a, 144a. A flange 146a is provided at one end of the shaft 146, and the other end 146b of the shaft 146 is swaged. A plurality of washers 148 are inserted between the shaft 146 and the rotation plate 140.

As shown in FIG. 11B, a base portion 144b is formed in the fixing plate 144 by bending 90 degrees from a portion where the hole 144a is arranged. The base portion 144b is fixed to the main body portion 164 of the first support post 162 by a screw 142.

As shown in FIG. 11A, two rotation stop portions 140a, 140b capable of coming into contact with the upper surface of the base portion 144*b* are provided at the lower ends of the rotation plates 140. Then, when the second support post 164 is vertically arranged with respect to the first support post 162, i.e., when the central axis of the first support post 162 is the same as the central axis 124 of the second support post 164 and the tilt angle is 0 degrees, the rotation stop portion 140*a* is in contact with the upper surface of the base portion 144*b* of the fixing plate 144. In this state, a predetermined clearance d4 is provided between the rotation stop portion 140*b* and the base portion 144*b*.

In FIG. 11A, the rotation plate 140 can rotate in a direction of arrow A3 until the rotation stop portion 140*b* comes into contact with the upper surface of the base portion 144*b*. Then, when the rotation stop portion 140*b* comes into contact with the upper surface of the base portion 144*b*, the rotation plate 140 no longer rotates in the direction of arrow A3. The clearance between the rotation stop portion 140*b* and the base portion 144*b* in the state of FIG. 11A is set so that the rotation plate 140 rotates about 6 degrees until the rotation stop portion 140*b* comes into contact with the base portion 144*b*. Therefore, according to the configuration of the support pillar portion 120 as described above, the second support post 164 can tilt within a range of 0 degrees to 6 degrees with respect to the first support post 162. The above tilt angle is merely an example, and the tilt angle is not limited thereto.

As described above, according to the display apparatus 100 of the present embodiment, a user can easily assemble the display apparatus 100, and the predetermined tilt operation can be performed.

Figure 12A:
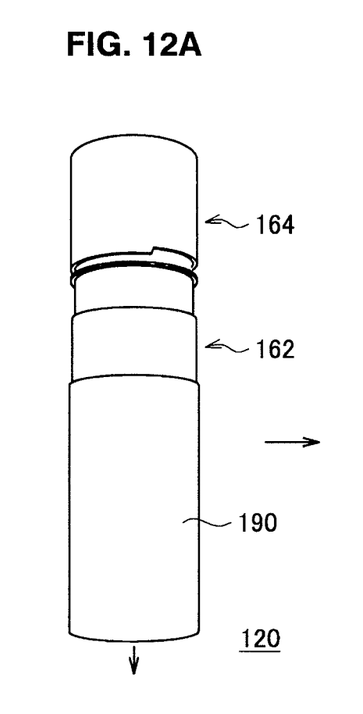
FIGS. 12A and 12B are schematic diagrams illustrating a cover member (external appearance member) attached to the outside of the support pillar portion.
Figure 12B:
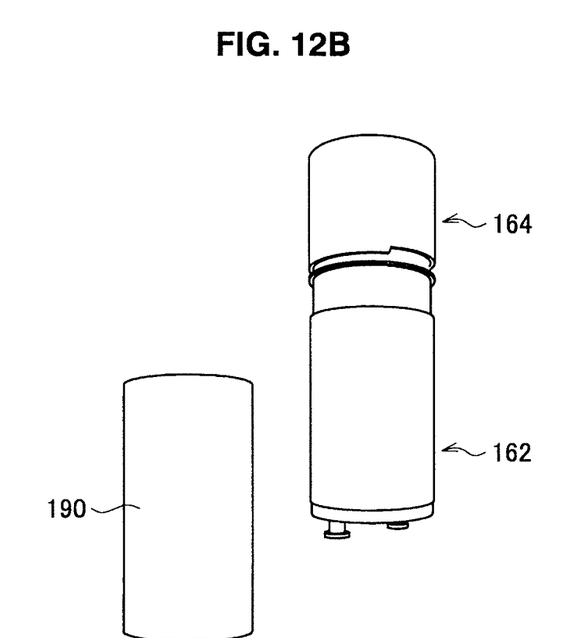

FIGS. 12A and 12B are schematic diagrams illustrating a cover member (external appearance member) 190 attached to the outside of the support pillar portion 120. The cover member 190 is made in a cylindrical form, and is attached to the first support post 162 of the support pillar portion 120. FIG. 12A is a schematic diagram illustrating the first support post 162 and the cover member 190 when the cover member 190 is detached in a direction of arrow from the first support post 162. FIG. 12B is a schematic diagram illustrating the first support post 162 and the cover member 190, when the cover member 190 is detached from the first support post 162, and is arranged side by side with the support pillar portion 120. Since the support pillar portion 120 is in the cylindrical form, and the cover member 190 is made in a hollow cylindrical form, a user can freely attach and detach the cover member 190 as shown in FIGS. 12A and 12B.

The material of the cover member 190 is considered to be various variations such as an aluminum extruded material, a plastic extruded material, and a plastic formed material. For example, like the aluminum plate 154 provided on the outside of the base portion 150, the cover member 190 can be made by applying alumite treatment to an aluminum material.

In this configuration, a user can freely attach and detach the cover member 190. For example, when cover members 190 in multiple colors are prepared, a user can change the color of the support pillar portion 120 to any color.

[5. Arrangement During Packing]

Figure 13A:
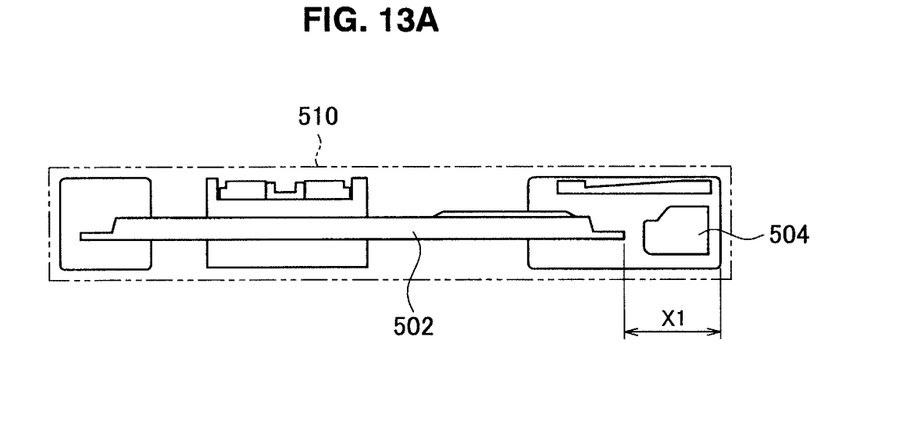
FIGS. 13A and 13B are schematic diagrams illustrating an arrangement of the display apparatus when it is packed.
Figure 13B:
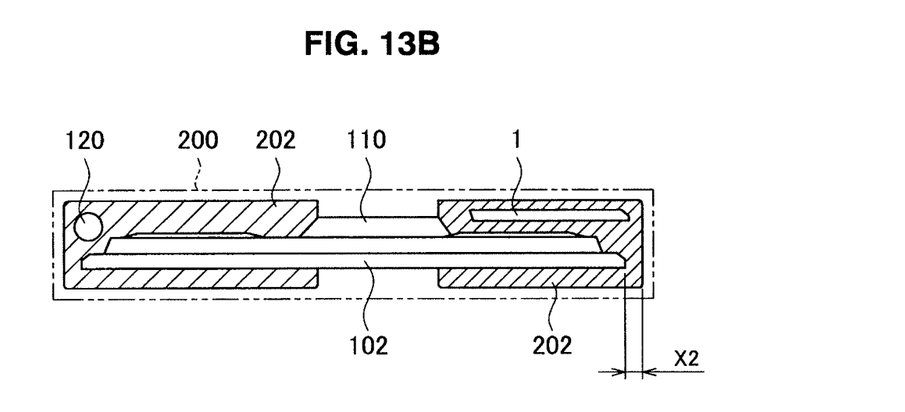

FIGS. 13A and 13B are schematic diagrams illustrating arrangement when the display apparatus 100 is packed. FIG. 13B is a cross-sectional view illustrating how the display apparatus 100 according to the present embodiment is packed. FIG. 13A is a cross-sectional view illustrating a comparative example showing how a display apparatus 500 having a display support pillar portion 504 in the related art is packed.

As shown in FIG. 13B, the display apparatus 100 according to the present embodiment is packed in a box 200 such as a corrugated cardboard carton while the head portion 110, the support pillar portion 120, and the base portion 150 are separated. The display panel 102 is attached to the head portion 110 in advance.

Each member is packed in the corrugated cardboard carton 200 together with a packing material 202 such as styrene foam.

In the comparative example shown in FIG. 13A, the display support pillar portion 504 in the related art is packed in a box 510 while it is separated from a display panel 502. Typically, the display support pillar portion 504 in the related art is made of a relatively large mold component that is made by insert-molding a bent metal plate. Therefore, in order to suppress the thickness of the box 510, the display apparatus 500 is packed in such a manner that the display support pillar portion 504 is arranged beside the display panel 502 as shown in FIG. 13A, which needs a large space having a width X1 at the side of the display panel 502.

In contrast, in the display apparatus 100 according to the present embodiment, it is only necessary to pack only the pillar-shaped support pillar portion 120 and the thin plate-shaped base portion 150 in addition to the display panel 102 to which the base portion 110 is attached. The support pillar portion 120 is constituted by only metal components, and sufficient strength can be obtained even when the support pillar portion 120 is relatively thin. Therefore, the occupied capacity can be reduced to the minimum. Therefore, even when the support pillar portion 120 is arranged so as to overlap the display panel 102 as shown in FIG. 13B, the support pillar portion 120 can be packed without creating a new space in the thickness direction of the display panel 102. On the other hand, since the base portion 150 is a thin metal plate, the base portion 150 can be arranged so as to overlap the display panel 102 without creating a new space in the thickness direction of the display panel 102. Therefore, as shown in FIG. 13B, it is not necessary to arrange any special space at a side of the display panel 102, and it is only necessary to arrange a space having a thickness X2 corresponding to the thickness of the packing material 202 such as styrene foam.

Therefore, when the display apparatus 100 of the present embodiment is packed, the capacity of the display apparatus 100 is much smaller than the capacity of an apparatus used in the past. Therefore, during shipment, a larger number of display apparatuses 100 can be transported during transportation by a truck and the like, and the transportation efficiency can be greatly improved. Therefore, the cost can be greatly reduced by improving the transportation efficiency.

[6. Holding Structure for Holding Wiring Cable in Head Portion]

Figure 14:
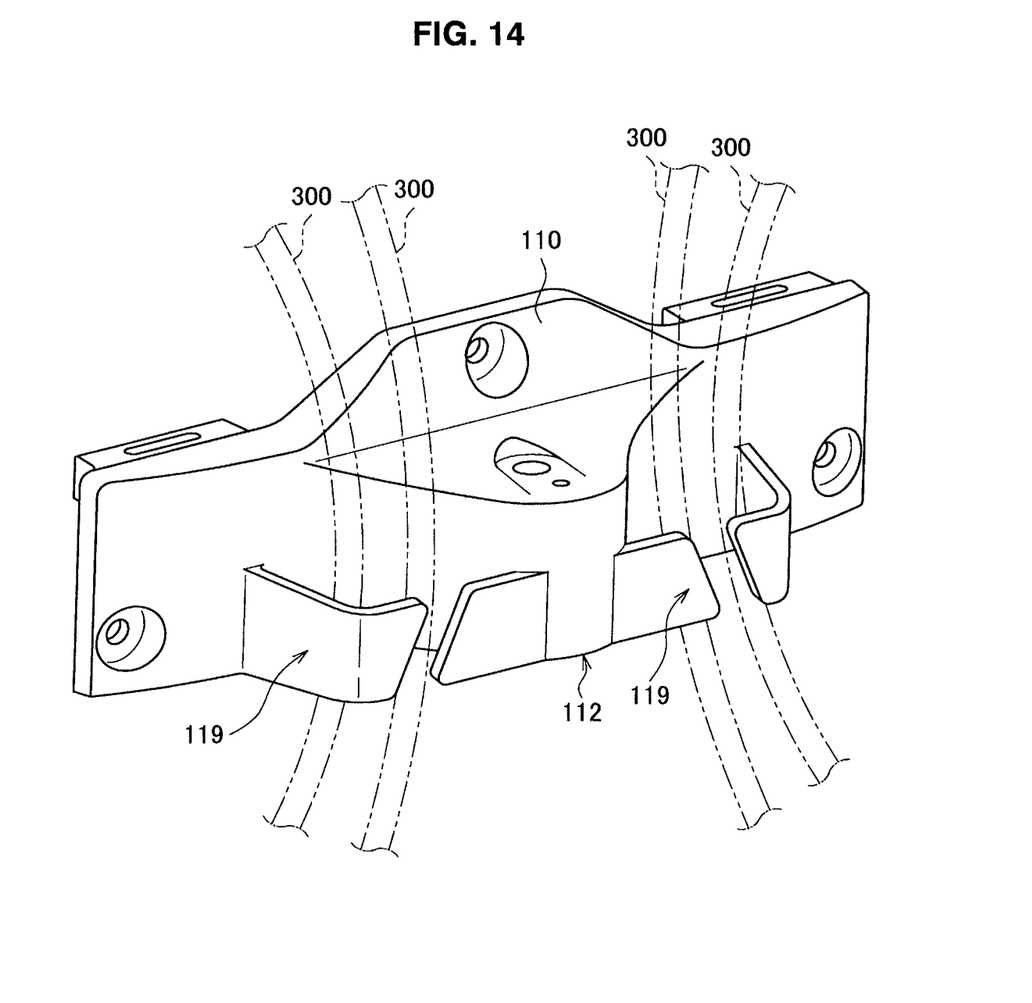
FIG. 14 is a schematic diagram illustrating the head portion as seen from the back side.

FIG. 14 is a schematic diagram illustrating the head portion 110 as seen from the back side. As shown in FIG. 14, cable holding units 119 into which wiring cables 300 are inserted are provided at both sides of the hole 112 of the head portion 110 into which the support pillar portion 120 is inserted. Various kinds of cables 300 such as a power supply cable, an image signal cable, and an audio signal cable are inserted into, and held by, the cable holding units 119.

Different kinds of cables are inserted into the two cable holding units 119. For example, a power supply cable is inserted into one of the cable holding units 119, and a signal cable is inserted into the other cable holding unit 119. The hole 112 is arranged between the two cable holding units 119, and the support pillar portion 120 is inserted into the hole 112. Accordingly, the power supply cable and the signal cable are completely separated while the support pillar portion 120 is interposed therebetween. Therefore, this configuration reliably prevents the power supply cable and the signal cable from being affected by noises.

It should be understood by those skilled in the art that various modifications, combinations, sub-combinations and alterations may occur depending on design requirements and other factors insofar as they are within the scope of the appended claims or the equivalents thereof.

The present disclosure contains subject matter related to that disclosed in Japanese Priority Patent Application JP 2010-165024 filed in the Japan Patent Office on Jul. 22, 2010, the entire content of which is hereby incorporated by reference.

What is claimed is:

1. A display apparatus comprising:
a head portion attached to a display panel which displays an image and having a hole arranged at a lower portion;
a support pillar portion extending in a vertical direction and fixed to the head portion by being inserted into the hole of the head portion, the support pillar portion being detachably attached to the head portion, and
a base portion that is in a flat plate shape, the support pillar portion being vertically attached to the base portion in a detachable manner,
wherein the support pillar portion includes a first support post and a second support post, wherein the first support post is fixed to the base portion, and wherein the second support post is directly connected with the first support post and attached to the head portion, and can tilt with respect to the first support post, and
wherein a protruding portion is arranged on the bottom surface of the support pillar portion, and a flange portion is arranged at a tip of the protruding portion, a base plate includes a first hole and a second hole, the flange portion can be inserted into the first hole, and the second hole is in communication with the first hole and has a smaller external diameter than that of the flange portion, and the protruding portion is inserted into the first hole, and the protruding portion is slid from the first hole to the second hole.

2. The display apparatus according to claim 1, wherein a first bolt insertion hole in communication with the hole is arranged at an upper portion of the head portion, and while the support pillar portion is inserted into the hole, a first bolt inserted into the first bolt insertion hole is fastened to a screw hole on an upper surface of the support pillar portion, whereby the head portion and the support pillar portion are fixed.

3. The display apparatus according to claim 2, wherein a step is arranged on a bottom surface of the hole such that a peripheral edge portion of the bottom surface is in a protruding form with respect to a central portion thereof, and when the bolt is fastened, the peripheral edge portion of the hole comes into contact with the upper surface of the support pillar portion.

4. The display apparatus according to claim 1, wherein a stopper is provided to stop rotation of the head portion with respect to the support pillar portion.

5. The display apparatus according to claim 1, wherein a second bolt insertion hole is arranged so as to penetrate through the base portion, and when the support pillar portion is vertically arranged on the base portion, a second bolt inserted into the second bolt insertion hole is fastened to a screw hole on a lower surface of the support pillar portion, whereby the base portion and the support pillar portion are fixed.

6. The display apparatus according to claim 5, wherein a step is arranged on an attachment portion of the support pillar portion of the base portion such that a peripheral edge portion corresponding to a profile of the support pillar portion is in a protruding form with respect to a central portion thereof, and when the second bolt is fastened, the peripheral edge portion in the protruding form comes into contact with the lower surface of the support pillar portion.

7. The display apparatus according to claim 1, wherein the second support post can tilt within a range of 0 degree to 6 degrees with respect to the first support post.

8. The display apparatus according to claim 1, wherein the support pillar portion is in a columnar shape, and has a detachable cover member in a cylindrical form.

* * * * *